Feb. 24, 1970  S. L. COCKRELL  3,496,912
ANIMAL HOUSING
Filed May 24, 1967
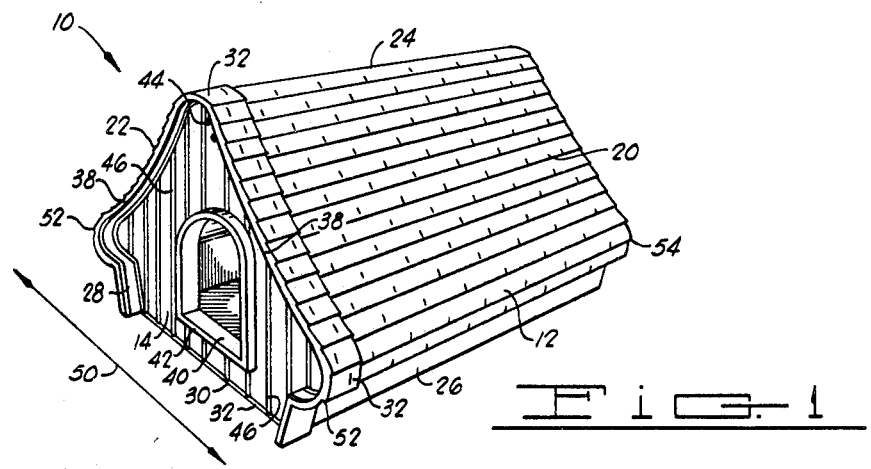
Fig. 1
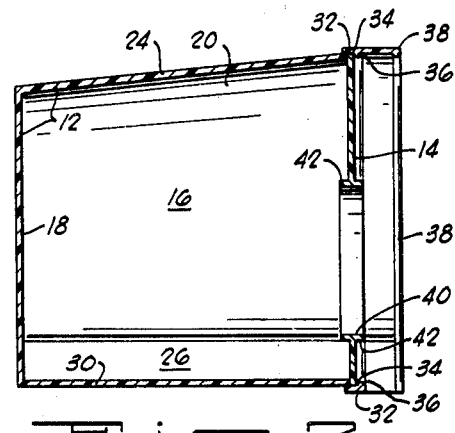
Fig. 2
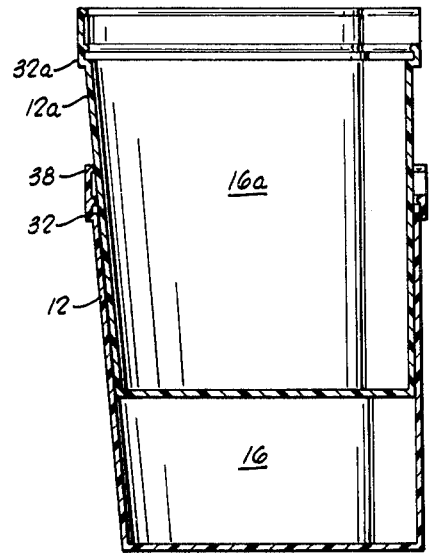
Fig. 3
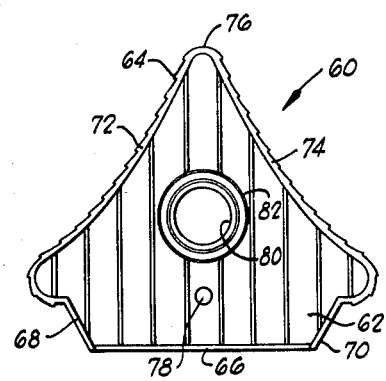
Fig. 4
INVENTOR.
SUSAN L. COCKRELL
BY
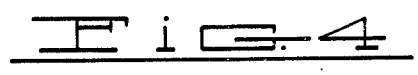
ATTORNEYS

3,496,912
ANIMAL HOUSING
Susan Lorene Cockrell, Irving, Tex., assignor to
Harry L. Long, Sr.
Filed May 24, 1967, Ser. No. 640,928
Int. Cl. A01k *1/00, 31/00*
U.S. Cl. 119—19                                       4 Claims

ABSTRACT OF THE DISCLOSURE

An improved animal house which can be formed in two parts for easy and rapid assembly and disassembly, the formation of a first part providing a unitary structure representing a rear side floor, side walls and roof which are uniformly tapered in an opitmum manner so that a plurality of first parts can be received one within the other to occupy a reduced total volume, the second part being formed as a front side panel which may be removably press-fit into the first part to form the animal house.

BACKGROUND OF THE INVENTION

Field of the invention

The invention relates generally to animal houses and, more particularly, but not by way of limitation, it relates to forming animal shelter structural components in a manner which enhances the transportation and storage capabilities of the units in disassembled form.

SUMMARY OF THE INVENTION

The present invention contemplates the information of animal shelters with a minimum of component parts, the constituent parts being shaped from plastic materials by molding or other conventional forming techniques. In a more limited aspect, the invention consists of forming a first part which constitutes an enclosure having a rear side and continuous lateral paneling extending from the edge thereof to form floor, roof and side portions, and a second unitarily formed member which includes a crawl hole or such and is shaped to be received securely within the lateral paneling to provide a front side to the enclosure. The invention also brings about an article of manufacture forming an animal shelter in two, easily assembled component parts, each of which is shaped in such a manner that a large number of the component parts for a plurality of shelters can be stored or transported in a relatively small volume of space.

Therefore, it is an object of the present invention to provide an improved animal shelter which is inexpensive and easily assembled and disassembled.

It is also an object of the invention to provide a shelter which may be designed for animals of various sizes and which may be formed from materials provided with decorative color and/or surface texture.

It is a further object of the present invention to provide an animal shelter which has improved qualities with respect to heat insulation and moisture exclusion.

Finally, it is an object of this invention to provide an animal shelter which has high strength and structural reliability and which has improved storage and transportation capabilities tending to enhance the likelihood of distribution through retail sales outlets.

Other objects and advantages of the invention will be evident from the following detailed description when read in conjunction with the accompanying drawings which illustrate the invention.

BRIEF DESCRIPTION OF THE DRAWINGS

FIG. 1 is a perspective view of one form of animal shelter, e.g. a dog house;

FIG. 2 is a longitudinal section of the shelter of FIG. 1;

FIG. 3 is a sectional view depicting the manner in which plural housing parts may be stacked; and FIG. 4 is a front elevation of a bird house as constructed in accordance with the present invention.

DESCRIPTION OF THE PREFERRED EMBODIMENT

FIG. 1 shows an animal house 10, in this case a dog or cat house styling, which consists of two unitary parts, a housing member 12 and a front panel member 14. Both housing member 12 and panel member 14 may be formed by conventional forming techniques from various plastics selected from the resilient, semi-rigid types, e.g. polyethylene, acrylics, polypropylene, and many other types of polyester resins. It will become apparent from the present specification that the present method of forming an animal shelter lends itself to use with numerous plastics or such materials as well as to different types of material forming procedures such as various molding techniques, thermo-forming, etc.

Referring also to FIG. 2, the housing member 12 defines an enclosure 16 within a rear side 18, roof portions 20 and 22 joined at peak 24, opposite rising wall portions 26 and 28, and finally a bottom or floor portion 30. An anterior rim 32 is formed completely around the front edge of housing member 12 and shaped to define an internal snap groove 34 therearound for the purpose of receiving front panel 14 therein in secure engagement as will be further described. The snap groove 34 is formed by a plurality of raised or bead portions 36 which are formed on the inner side of rim 32 at spaced intervals. The use of beads 36 is deemed preferable to a continuous rib portion since it does not contribute to the trapping of water on or near the floor portion 30.

The anterior rim 32 is extended forward adjacent each of rising walls 26 and 28 and opposing roof portions 20 and 22 to provide a short overhang 38. Overhang 38 provides a decorative effect as well as the function of further sheltering the animal from the elements. Various additional decorative effects can be embodied as, for example, the shingle-like texture which is shown formed on the exterior surfaces of roof portions 20 and 22, such texture and color effects are easily added by operations integral with the selected forming techniques.

The front panel member 14 is a flat panel of proper size and shape to be received press-fit within snap groove 34, panel member 14 having an access hole 40 formed therethrough. In the particular showing of FIGS. 1 and 2, panel member 14 is a molded piece having combing 42 about the access hole 40 and being further provided with ventilation holes 44 and a decorative, clapboard effect as conveyed by the butt-joint texture or grooves 46. The molded combing portion 42 surrounding access hole 40 provides additional strength and rigidity to panel member 14.

As previously stated, aside from the ease of manufacture, relatively low cost, functional structure and pleasing appearance of an animal house such as animal shelter 10, a primary attribute is its particular design which enables improved storage and transportation capabilities. These capabilities are enhanced by forming the animal shelter 10 with a slight inward taper of all lateral paneling portions (roof portions, rising wall portions, etc.) proceeding from anterior rim 32 toward the rear side 18 of housing member 12. Thus, as noted in FIG. 2 a slight inward taper toward a longitudinal axis can be noted between roof peak 24 and floor portion 30 proceeding toward rear side 18 of housing member 12; similarly, an inward taper is formed into the remaining lateral surfaces of housing member 12. That is, and referring to FIG. 1, a dimension 50 taken between opposite forward eave peaks 52 would be slightly greater than a similar dimension taken between the opposing rear eave peaks 54, a posteriorly tapering shape being apparent about the entire lateral paneling of housing member 12.

FIG. 3 shows the manner in which enhanced storage is effected by stacking or serially enveloping a plurality of the enclosure members, each of which normally fills out a large volume of space. Thus, the housing member 12 can receive a second housing member 12a inward within its enclosure space 16 and next additional housing members (not shown) can be similarly inserted in serial manner with the net result of a plurality of such members being stored in a very much reduced volume of space.

It is planned in practice that the amount of taper and the resilience of selected construction material, will allow the inserted housing member 12a to come nearly all of the way down into the housing member 12. That is, the insertion can be stopped by the anterior rim 32a resting upon the over-hang portion 38 of anterior rim 32.

The respective front panel members 14 and 14a (not shown) for the respective animal shelters are no problem since they are essentially flat panels and take up very little space when stacked in contiguous placement. Thus, it can be seen how a great saving can be effected in transportation and warehouse space when the respective housing members 12 of each animal shelter 10 can be stacked within each other as described. Actually, stored shelter units conserve space at an exponentially increasing ratio and such possible savings can be extremely advantageous with respect to retail sales space.

FIG. 4 depicts the similar shelter construction principles as applied to a bird house 60. The bird house 60 is similarly formed to have a front panel member 62 and a unitary housing member 64 whose lateral paneling consists of floor portion 66 joined to opposite rising wall portions 68 and 70 which are formed into respective roof portions 72 and 74 which, in turn, are joined at roof peak 76.

Here again the lateral paneling (roof portion 72, 74, etc.) of housing member 64 is uniformly tapered proceeding posteriorly to form a rear wall (not shown) similar to the rear wall 18 of animal shelter 10 (FIG. 2). The front panel 62 of bird house 60 may be formed with a hole or punchout 78 for receiving a perch or such therein, and a further hole 80 may be provided to serve as bird access entry. A plurality of guide grooves 82 may also be molded in the front panel 62 in the event that a user wants to enlarge the access opening 80.

Here again, the similar materials and molding techniques may be selected and any of various exterior textures and material colors may be employed. The storage and transport capabilities of bird house 60 will be enhanced in the same manner as for the larger types of animal shelters 10.

It should be understood that the primary advantages are the ease of manufacture and the saving of storage space and that certain structural features may be altered without departing from the essential teachings. Thus, animal access may be provided through any selected surface of the animal house and such factors as the specific means for securing the two parts of a housing unit may be varied in accordance with exigencies of the situation.

The foregoing sets forth novel animal shelter structure and mode of formation which enables unique advantages in storing and transportation of such items in large quantity. The housing structures constructed in accordance with the present invention can be designed to be quite large and to adapt to stacked, space-saving storage when disassembled into two unitary members. Thereafter, a selected two of the unitary members can be rapidly and easily assembled to provide a rugged, weather-proof, attractive animal shelter.

Changes may be made in the combination and arrangement developments as hereinbefore set forth in this specification and shown in the drawings; it being understood that changes may be made in the embodiments disclosed without departing from the spirit and scope of the invention.

What is claimed is:

1. An article of manufacture constituting a two-piece animal shelter, comprising:
    an enclosure member formed as a unitary piece, having a rear side, a floor, a pair of side walls and a roof portion, said floor, said pair of side walls, and said roof portion each being connected at one end thereof to said rear side and each divergently tapering outwardly from said rear side and terminating in free ends forming an open end opposite said rear side such that one enclosure member is adapted to be nested within a portion of a second enclosure member for storage purposes, said rear side being of a smaller area than the area defined by said open end, said enclosure member having a resilient snap groove formed about a portion of an inner surface of said floor, side walls and roof portion and spaced inwardly of the free ends of said walls and roof portion whereby an overhang is provided,
    a resilient panel member having an animal access hole provided therethrough, said panel member being of a shape to matingly conform to said enclosure member snap groove, and being removably secured in said snap groove.

2. An animal house as set forth in claim 1 wherein a plurality of bead formations are disposed about the inner surface of said enclosure member to form said snap groove such that said panel member can be pressed into said opening and retained therein by said bead formations.

3. An animal house as set forth in claim 1 wherein said unitary enclosure member and said panel member are each formed of polyester resin.

4. An article as set forth in claim 1 which is further characterized in that:
    said roof portions are formed with an exterior texture simulating roofing material and said front of said panel member is formed with an exterior texture simulating siding material.

References Cited

UNITED STATES PATENTS

| | | | |
|---|---|---|---|
| 2,567,322 | 9/1951 | Curtis | 220—97 X |
| 3,244,148 | 4/1966 | Long | 119—23 |

FOREIGN PATENTS 608,926   2/1935   Germany.

HUGO R. CHAMBLEE, Primary Examiner

U.S. Cl. X.R.

119—23